March 10, 1970 L. E. HALL ET AL 3,500,290

TERMINAL CONSTRUCTION FOR ELECTRICAL CIRCUIT ELEMENT

Filed July 1, 1968

INVENTORS
JOHN P. DOERING JR.
LLOYD E. HALL
ROY G. BRANT

BY [signature]

United States Patent Office 3,500,290

Patented Mar. 10, 1970

3,500,290

TERMINAL CONSTRUCTION FOR ELECTRICAL CIRCUIT ELEMENT

Lloyd E. Hall, Fullerton, Roy Gene Brant, Huntington Beach, and John Peter Doering, Jr., Santa Ana, Calif., assignors to Beckman Instruments, Inc., a corporation of California Filed July 1, 1968, Ser. No. 741,428
Int. Cl. H05k *1/08*
U.S. Cl. 339—17 6 Claims

ABSTRACT OF THE DISCLOSURE

A terminal structure for use with a substrate having an electrical circuit network thereon including a conductive portion adjacent a free edge of the substrate. The terminal comprises a strip of electrically conductive spring material having a hole therein adapted to mate with a hole in the substrate and adjacent the edge of the substrate. The terminal is retained on the substrate by clamping means, such as an eyelet or rivet, which retains the forward edge of the terminal in electrical contact with the conductive network. A resilient tab extending downwardly from the terminal engages the substrate and forces the rearward portions of the terminal upwardly against the pressure of the clamping means, thereby forcing the forward edge of the terminal against the conductive material and producing a space between the rearward portions of the terminal and the substrate for expansion of the substrate.

This invention is particularly applicable to electrical circuit devices such as microcircuit networks, or switching devices employing ceramic or plastic substrates that tend to expand under varying temperature conditions. The surface of the base member or substrate has deposited thereon an electrical network formed of an electrically conductive material and may also include various deposited or discrete components, such as capacitors, resistors and transistor devices which are electrically connected into the deposited electrical network. The device requires some means for electrically connecting the electrical network to external sources of power or for electrically connecting it with other electrical apparatus. In micromodule technology, various termination arrangements have been employed in the past, such as lead wires soldered to the deposited layer material or spring clamp terminals which clamp over the edge of the device in contact with the conductive material thereon.

Other types of terminals include terminal members which are clamped or retained on the substrate by means of a rivet or eyelet means passing through the terminal and through a hole formed in the substrate. In order to attach the terminal in this way, it has been the practice in the past to clamp the terminal so that the lower surface thereof is forced solidly against the substrate. This prevents movement of the terminal which can result in interruption of electrical contact between the terminal and the electrical conductive film layer on the surface of the substrate. However, when such terminals are riveted or so solidly attached to the substrate, any expansion of the substrate either causes the substrate to fracture or deforms the rivet, eyelet or compression clamp. When the substrate fractures, this usually destroys the device. If the compression clamp is deformed and the substrate then contracts, the terminal may become loose and electrical contact with the conductive layer may be interrupted.

It is an object of the present invention to provide a new and improved terminal structure that may be attached to a substrate by a compression clamping means, such as a rivet or eyelet, yet permits reasonable amount of expansion and contraction of the substrate while still retaining the contacting portions of the terminal in close and relatively isolated contact with the conductive film on the substrate.

Further objects and advantages of the invention will become apparent as the following description proceeds and the features of novelty which characterize the invention will be pointed out with particularity in the claims annexed to and forming a part of the specification.

For a better understanding of the invention, reference may be had to the accompanying drawings in which.

Figure 1:
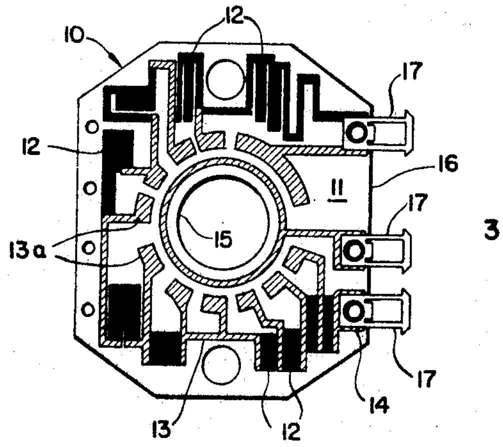
FIGURE 1 is a plan view of a substrate or base member having an electrical network deposited thereon and illustrating the type of device with which the terminal structure of the present invention is particularly well adapted.

Referring now to FIGURE 1, there is shown an enlarged view of a microcircuit switching element including a suitable nonconductive base member or substrate 10 having deposited on a flat surface 11 thereof an electrical network including a plurality of resistance elements 12 which are in turn connected by a network of electrically conductive material 13 also deposited on the surface of the base member. Electrical connectors 13 also include a plurality of contact switch pads 13*a* formed in an array on the surface 11 of the base member and arranged in a path to be traversed by a conductive wiper (not shown) which may be inserted and mounted through the opening 15 formed through the base member. Each of the switch pads 13*a* may be engaged in sequence as a switching arm of an electrically conductive contactor (not shown) traverses its path over the surface of the base member. An example of such a switching mechanism is described in patent application No. 673,399, filed in the name of Stanley Schneider, and entitled "Integral Electrical Switch and Circuit Module," which application is assigned to Beckman Instruments, Inc., the assignee of the present application.

Preferably the substrate base member 10 or wafer is formed of a nonconductive high temperature resistant material such as a ceramic material of alumina, steatite, or the like. Other types of materials may be employed, such as glass filled epoxy, or any other insulating material.

As will be seen in FIGURE 1, at least one of the electrically conductive connectors 13 extends adjacent the free edge 16 of the substrate. In the illustrated embodiment, the electrically conductive material forms termination pads 14 along the edge 16 of the substrate. The pads 14 are electrically contacted by terminals 17 which are attached to the base member and to which electrical leads or other electrical attachments may be connected.

Figure 2:
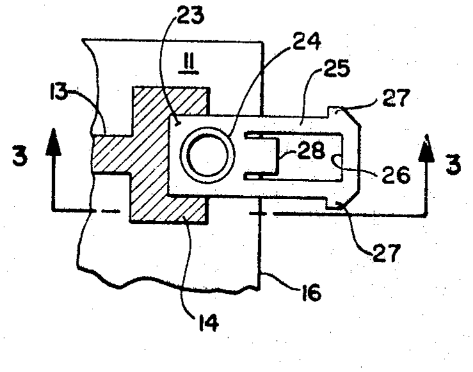
FIGURE 2 is an enlarged plan view of a portion of the substrate illustrating in detail the terminal mounting arrangement.
Figure 5:
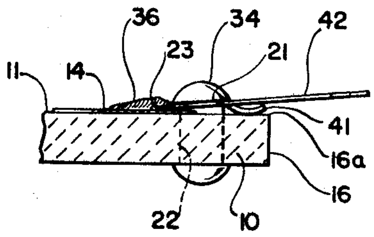
FIGURE 5 is an enlarged cross-sectional view, similar to that of FIGURE 3, illustrating still another embodiment of the invention.

Terminals 17 may be formed of brass or any other suitable electrically conductive spring-like material, which may be stamped into shape. As may best be seen in FIGURE 3, each of the terminals 17 includes a hole 21 formed therein which is adapted to mate with a suitable hole 22 formed through the substrate adjacent the edge 16 thereof. The terminal 17 is provided with a forward edge or portion 23 which rests on top of the pad 14 and arranged in good electrical contact therewith. The terminal is attached to the substrate by means of a compressive clamping means positioned through the respective openings 21 and 22 of the terminal and substrate. In the preferred embodiment of the invention, the clamping means comprises an eyelet 24, as shown in FIGURES 2 and 3, or a rivet 34, such as illustrated in FIGURE 5.

The rearward portion 25 of the terminal extends outwardly beyond the free edge 16 and may include openings, such as opening 26 and shoulders 27 which may be employed for the attachment of external leads or connectors. As may best be seen in FIGURE 3, the rearward portions of the terminal 17 are forced away from the surface 11 of the substrate by a resilient tab 28 projecting downwardly from the terminal. In the embodiment disclosed in FIGURES 2 and 3, the tab 28 is formed as an integral part of the terminal appropriately slit from the central portions of the terminal and deformed downwardly either during the stamping or a later operation. The tab 28 in FIGURE 3 abuts against the upper corner 16*a* of the free edge 16 of the substrate and exerts a force opposing the compressive force of the clamping means on the terminal. That is, the tab is placed in compression by the force of the eyelet 24 and supports the lower surface of the terminal away from the surface 11 of the substrate. The tab 28 also provides a resilient force around the eyelet as a fulcrum which, in addition to supporting the rear portions of the terminal away from the substrate, also forces the forward edge 23 of the terminal downwardly against the surface of the termination pad 14.

Figure 3:
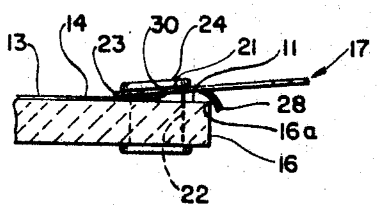
FIGURE 3 is a partial cross-sectional view taken along line 3—3 of FIGURE 2.

It is preferable, in clamping the rivet 24 or compression clamp down onto the terminal, to provide a small space 30 (as seen in FIG. 3) between the lower surface of the terminal 17 and the upper surface 11 of the substrate. This space 30 provides room for expansion of the substrate relative to the eyelet 24 or clamping means. Even when the substrate 10 contracts, the resiliency of the tab 28 still provides a mechanically secure and electrically conductive connection.

In practice, it has been found that the eyelet may sometimes be clamped down too tight on the substrate. When this happens the substrate sometimes fractures when it expands. More often than not, however, the expansion of the substrate causes a certain amount of deformation of the clamping means. The eyelet 24 may elongate or be turned up slightly at its overturned edges, thereby providing space for expansion of the substrate. When the substrate again contracts, after such an expansion, the resiliency of the tab 28, or upward force of the tab, causes the terminal to accommodate itself to the additional space resulting from the deformed eyelet and securely holds the terminal in place, forcing the forward edge 23 into good electrical contact with the termination pad 14.

Note also that this structure substantially isolates the forward edge 23 of the terminal from movement when the rearward portions of the terminal are moved. In practice, it has been found possible to move the rearward portions 27 of the terminal quite drastically without remotely affecting the forward edge 23, which is substantially isolated from movement by the tab 28 and the rivet 24.

Figure 4:
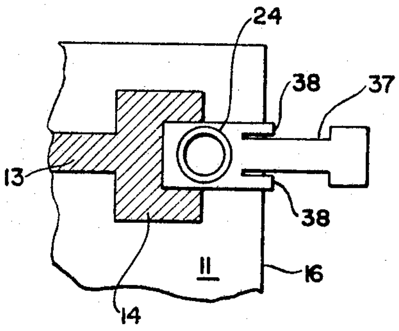
FIGURE 4 is an enlarged plan view illustrating another embodiment of the invention.

Referring now to FIGURE 4, there is shown a second embodiment of the terminal in which the rearward portions of the terminal comprise a shank 34 and the terminal includes a pair of tabs 38 disposed on opposite sides of the shank and bent downwardly against the edge or corner 16*a* of the substrate. The remaining portions of this terminal are substantially similar to those of the previous embodiment in which the eyelet 24 retains the terminal in place on the substrate. Shank 37 may be adapted to engage connector slots of other electrical devices or may be attached to conductive leads extending to other such devices. The tabs 38 act similarly as the tab 28 in retaining the terminal above the surface 11 of the substrate and aid in restraining the forward portion 23 of the terminal against undesired movement. This embodiment has an advantage over the previous embodiment in that the tabs 38 have a greater moment about the axis of the eyelet 24 and are more effective in preventing lateral movement or rotation of the terminal about the eyelet during handling thereof.

In FIGURE 5, there is shown another embodiment of the invention in which the compressive retaining means comprises a rivet 34 and in which the tab 41 is formed to engage the surface 11 of the substrate. In this embodiment, the holes 21 and 22 formed in the terminal and the substrate are substantially farther away from the edge 16 than in the previous embodiment. The tab 41 has a surface thereon abutting the surface 11 of the substrate rather than the edge 16*a* of the substrate. This embodiment, while very effective against expansion of the substrate, does not provide as much protection against lateral movement of the rearward portion 42 of the terminal. Any lateral movement, or movement about the axis of the rivet 34, may cause the forward edge 23 of the terminal to move.

It may be desirable in order to improve the electrical connection between the terminal and the conductive pad 14 to deposit an electrically conductive solder material over the forward edge or portion 23 of the terminal and on the pad 14. This arrangement is illustrated in FIGURE 5 in which solder material 36 assures a good electrical connection between the forward edge 23 of the terminal and the conductive terminal pad 14.

While in accordance with the Patent Statutes there have been described what are considered to be the preferred embodiments of the invention, it will be obvious to those skilled in the art that various changes and modifications may be made therein without departing from the invention.

What is claimed is:

1. In combination:

a substrate having a surface with an electrical circuit network thereon including at least one conductive connector, said substrate having at least one terminal mounting hole therethrough;

a terminal in the form of a strip of electrically conductive material, said terminal being positioned on said substrate and having a hole therein in alignment with said terminal mounting hole in said substrate, a forward portion of said terminal being positioned on said conductive connector;

at least one resilient tab on said terminal projecting downwardly from said terminal against said substrate, said tab being attached to said terminal on the opposite side of said hole from said forward portion of said terminal contacting said conductive connector; and clamping means positioned through said respective holes in said terminal and said substrate attaching said terminal to said substrate, said downwardly extending tab exerting a force on said terminal away from said surface of said substrate forcing said forward portion of said terminal into good electrically conductive contact with said conductive connector, said resiliency of said tab permitting expansion and contraction of said substrate during changes in temperature, while maintaining said forward portion of said terminal in good electrically conductive contact.

2. The combination defined in claim 1 in which said tab comprises an integral portion of said terminal material bent downwardly, said terminal being so positioned that said tab abuts against an edge of said substrate.

3. The combination defined in claim 1 in which said tab is formed by a center piece of said terminal appropriately cut around three sides thereof from the center portions of said terminal and deformed downwardly against said substrate.

4. The combination defined in claim 1 including two tabs each formed on opposite sides of said rearwardly extending portion of said terminal, each of said tabs being deformed downwardly against an edge of said substrate.

5. The combination defined in claim 1 in which said clamping means through said aligned holes comprises an eyelet having the one end bent over against the lower surface of said substrate and the upper end bent over against the upper surface of said terminal, said eyelet compressing said terminal downwardly against the surface of said substrate.

6. The combination defined in claim 1 in which said clamping means through said aligned holes comprises an eyelet having one end bent over against the lower surface of said substrate and the upper end bent over against the upper surface of said terminal, said eyelet compressing said terminal downwardly against the force of said tab but leaving a small space between the upper surface of said substrate and the lower surface of said terminal.

References Cited

UNITED STATES PATENTS

| | | | |
|---|---|---|---|
| 1,729,873 | 10/1929 | Hengstenberg ------- | 339—219 |
| 1,874,594 | 8/1932 | Olson -------------- | 339—219 |
| 3,152,228 | 10/1964 | Broadhead. | |
| 3,213,211 | 10/1965 | Allison. | |
| 3,314,042 | 4/1967 | Gabrielian. | |

MARVIN A. CHAMPION, Primary Examiner

P. A. CLIFFORD, Assistant Examiner

U.S. Cl. X.R.

200—11, 166; 339—219